(12) United States Patent
Nellen et al.

(10) Patent No.: US 11,479,092 B2
(45) Date of Patent: Oct. 25, 2022

(54) FRAME ASSEMBLY FOR AN OPEN ROOF ASSEMBLY AND A METHOD OF PROVIDING SUCH A FRAME ASSEMBLY

(71) Applicant: Inalfa Roof Systems Group B.V., Oostrum (NL)

(72) Inventors: Marcel Johan Christiaan Nellen, Merselo (NL); Rainer Gerhard Jüngling, Mönchengladbach (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 57 days.

(21) Appl. No.: 17/222,655

(22) Filed: Apr. 5, 2021

(65) Prior Publication Data

US 2021/0309088 A1    Oct. 7, 2021

(30) Foreign Application Priority Data

Apr. 7, 2020   (EP) .................................... 20168499

(51) Int. Cl.
*B60J 7/02*   (2006.01)
*B60J 10/34*  (2016.01)
*B60J 10/90*  (2016.01)

(52) U.S. Cl.
CPC ................. *B60J 7/022* (2013.01); *B60J 7/02* (2013.01); *B60J 10/34* (2016.02); *B60J 10/90* (2016.02)

(58) Field of Classification Search
CPC ..... B60J 7/02; B60J 7/022; B60J 7/043; B60J 7/0435

USPC .............. 296/216.02–216.05, 216.06–216.08
See application file for complete search history.

(56) References Cited

U.S. PATENT DOCUMENTS

| 9,849,761 B2 * | 12/2017 | Hiramatsu ............... B60J 7/043 |
| 10,369,871 B2 | 8/2019 | Hoelzel |
| 2017/0313168 A1 | 11/2017 | Hoelzel |
| 2020/0262277 A1 | 8/2020 | Yoshikawa et al. |

FOREIGN PATENT DOCUMENTS

| DE | 102008046332 A1 | 6/2010 |
| DE | 102014117049 A1 | 5/2016 |
| DE | 102017116116 A1 | 1/2019 |
| DE | 202020100837 U1 | 4/2020 |

OTHER PUBLICATIONS

European Search Report in corresponding European Patent Application No. 120168499.0 dated Sep. 24, 2020.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A frame assembly for an open roof assembly comprises a first beam, a second beam and a panel. The first beam and the second beam are mechanically coupled in a joint area, thereby forming a seam. A sealant is provided in the joint area for providing a liquid-tight joint. The panel is at least partly arranged over the first beam and the second beam such that the joint area is at least partly overlapped by the panel. An adhesive bead is solely provided on the first beam for supporting the panel on the first beam, the adhesive bead sealing a dry area between the first beam and the panel.

13 Claims, 6 Drawing Sheets

FRAME ASSEMBLY FOR AN OPEN ROOF ASSEMBLY AND A METHOD OF PROVIDING SUCH A FRAME ASSEMBLY

BACKGROUND

The discussion below is merely provided for general background information and is not intended to be used as an aid in determining the scope of the claimed subject matter.

The invention relates to a frame assembly for an open roof assembly and a method of providing such a frame assembly.

Open roof assemblies are well known in the art. The known open roof assemblies are arranged on a roof of a vehicle, wherein an opening is provided in the roof. A moveable closure member is selectively in an open position or in a closed position. In the open position, an interior of the vehicle is in open contact with an exterior of the vehicle, e.g. for providing fresh air in the interior. In the closed position, the interior of the vehicle is closed and protected against rain and other external influences, for example. In the known open roof assembly, the closure member may be (semi-)transparent to allow sunlight to enter the interior, when the closure member is in the closed position.

The closure member is arranged on a frame. It is known to provide a monolithic frame or a multi-piece frame assembly. In the multi-piece frame assembly at least two frame elements are arranged next or partly on top of each other. Still, as part of the roof, the frame assembly may be partly subjected to water, like rain water, and therefore a fluid tight attachment may be required, at least at some positions. Further, it is noted that as described herein, the frame assembly may be used with an open roof assembly having a moveably arranged closure member. Still, the frame assembly may as well be used with a fixed roof member, like a transparent panel.

In a known open roof assembly, a front cover panel is provided fixed to the monolithic frame with a suitable adhesive. The adhesive is provided as a ring-shaped adhesive bead for providing and sealing a dry area. As used herein, a dry area is an area of the frame or frame assembly that is protected against liquids like water. A wet area—opposed to a dry area—is an area where liquids like water are allowed. Such wet areas are usually needed for water management, e.g. for guiding rain water.

In practice, it may still be challenging to provide a liquid-tight crossing at the transition, in particular in mass-production manufacturing. Testing may be required during manufacturing to ensure the liquid-tightness. Further, the shape of the seam is complex and adds costs to the frame assembly.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, a frame assembly for an open roof assembly comprises a first beam, a second beam and a panel. The first beam and the second beam are mechanically coupled in a joint area, thereby forming a seam. A sealant is provided in the joint area for providing a liquid-tight joint. The panel is at least partly arranged over the first beam and the second beam such that the joint area is at least partly overlapped by the panel. An adhesive bead is solely provided on the first beam for supporting the panel on the first beam, the adhesive bead sealing a dry area between the first beam and the panel.

The dry area is arranged such that the adhesive bead does not need to cross the seam. The seam is arranged in a wet area. This alleviates the design requirements on the seam and the requirements on the manufacturing accuracy for achieving a liquid-tight sealing of the dry area. Moreover, testing for liquid-tightness of the adhesive-seam crossing is not needed, further easing manufacturing.

The frame assembly as above described may be achieved by adapting a size of the dry area, where possible, or by designing the first and second beams of the frame assembly such that the seam is not in a dry area. In another example, a required dry area may be split into two dry areas with the seam arranged in-between.

In an embodiment, the adhesive bead forms a ring and the ring of adhesive forms and encloses the dry area. Thus, the dry area is defined and formed by the bead of adhesive.

In an embodiment, the panel is supported on the second beam by a further support. Depending on a size of a part of the panel arranged over the second beam, said part of the panel may be supported on the second beam using further support. Such further support may be applied to prevent undesired vibrations of said part of the panel, which could result in undesired noise, for example. In a particular embodiment, the adhesive bead is a first adhesive bead and the panel is supported on the second beam by a second adhesive bead. The second adhesive bead may take many forms. For example, the second adhesive bead may be a straight line, one or more dots, a ring-shape or any other suitable form or shape. Such a bead shape may be suitably selected taking into account liquid management, noise control and other aspects by a person skilled in the art.

In an embodiment, the sealant is an adhesive sealant and wherein the first beam and the second beam are mechanically coupled by the adhesive sealant. Thus, the sealing function and the mechanical coupling may be combined by use of a suitable adhesive sealant. In another embodiment, the first beam and the second beam are mechanically coupled by a mechanical attachment, for example at least one of an adhesive, a screw, a rivet, a clip, a weld and/or a spot-weld. Thus, a secure mechanical may be provided without imposing adhesive requirements on the sealant. Still, in this embodiment, the sealant may still exhibit adhesive properties. Further, it may be preferred not to apply adhesive for the mechanical attachment, but to use an attachment like a screw, a rivet or a weld, such that the optimal mechanical coupling strength is immediately achieved, which simplifies the handling during manufacturing.

In an embodiment, a through-hole is formed in the first beam and the dry area is arranged over the through-hole. The through-hole may be provided for a number of different functions. Usually, the through-hole is applied for air exchange for preventing condensation of moisture or drying/curing of an adhesive, e.g. the adhesive bead. In a particular embodiment, the through-hole may be applied for enabling an electrical wiring to pass through the first beam. Other applications are deemed apparent to those skilled in the art. In any case, providing the dry area around such through-hole may be preferred for ease of water-management.

In an embodiment, the first beam and the second beam at least partly overlap in the joint area and the sealant is arranged between the first beam and the second beam where the first beam and the second beam overlap. This provides for a simple liquid-tight joint. In a particular embodiment thereof, one of the first beam and the second beam has a recessed edge area and the other one of the first beam and the second beam is arranged overlapping the recessed edge area. Arranging one beam over the recessed edge area of the other beam enables to provide for a flush surface.

In a further particular embodiment, one of the first beam and the second beam comprises a mechanical coupling area and a sealing area, the sealing area being recessed relative to the mechanical coupling area, and the first beam and the second beam are mechanically coupled in the mechanical coupling area; and the sealant is arranged between the first beam and the second beam in the sealing area. In a more particular embodiment, the mechanical coupling area and the sealing area are arranged in the above described recessed edge area. Thus, a simple mechanically strong, liquid-tight coupling between the first beam and the second can be provided with a flush surface. It is noted that, as used herein, "flush" means that a surface of the first beam and a surface of the second beam are at a substantially same level, but a seam between the two surfaces may form a recess.

In an embodiment, the first beam is a front beam, the second beam is a side beam and the panel is a front cover panel. The front cover panel may be an outer cover providing an aesthetically pleasing surface as a top surface of the open roof assembly.

In a further aspect, a method provides a frame assembly comprising a first beam, a second beam and a panel. The method comprises providing a sealant on a surface of one of the first beam and the second beam; mechanically coupling the first beam and the second beam in a joint area, thereby forming a seam, wherein the sealant is arranged in the joint area for providing a liquid-tight joint; providing an adhesive bead solely on the first beam for supporting the panel on the first beam and sealing a dry area between the first beam and the panel; and arranging the panel on the adhesive bead and at least partly over the first beam and the second beam such that the joint area is at least partly overlapped by the panel. Thus, in a few simple steps, a strong and liquid-tight frame assembly as above described is provided.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

DETAILED DESCRIPTION OF THE ILLUSTRATIVE EMBODIMENTS

Figure 1A:
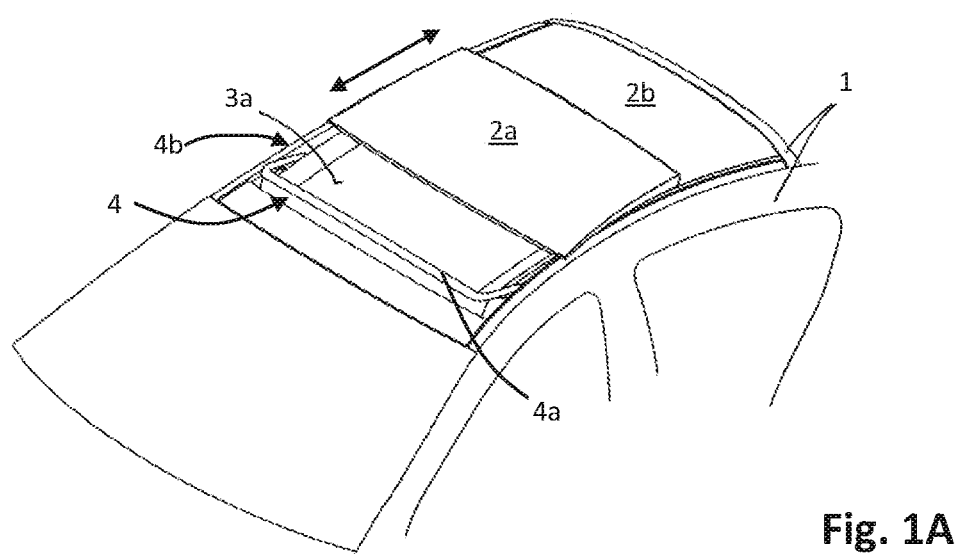
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end (RE) of the moveable panel 2a is raised as compared to the closed position, while a front end (FE) of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
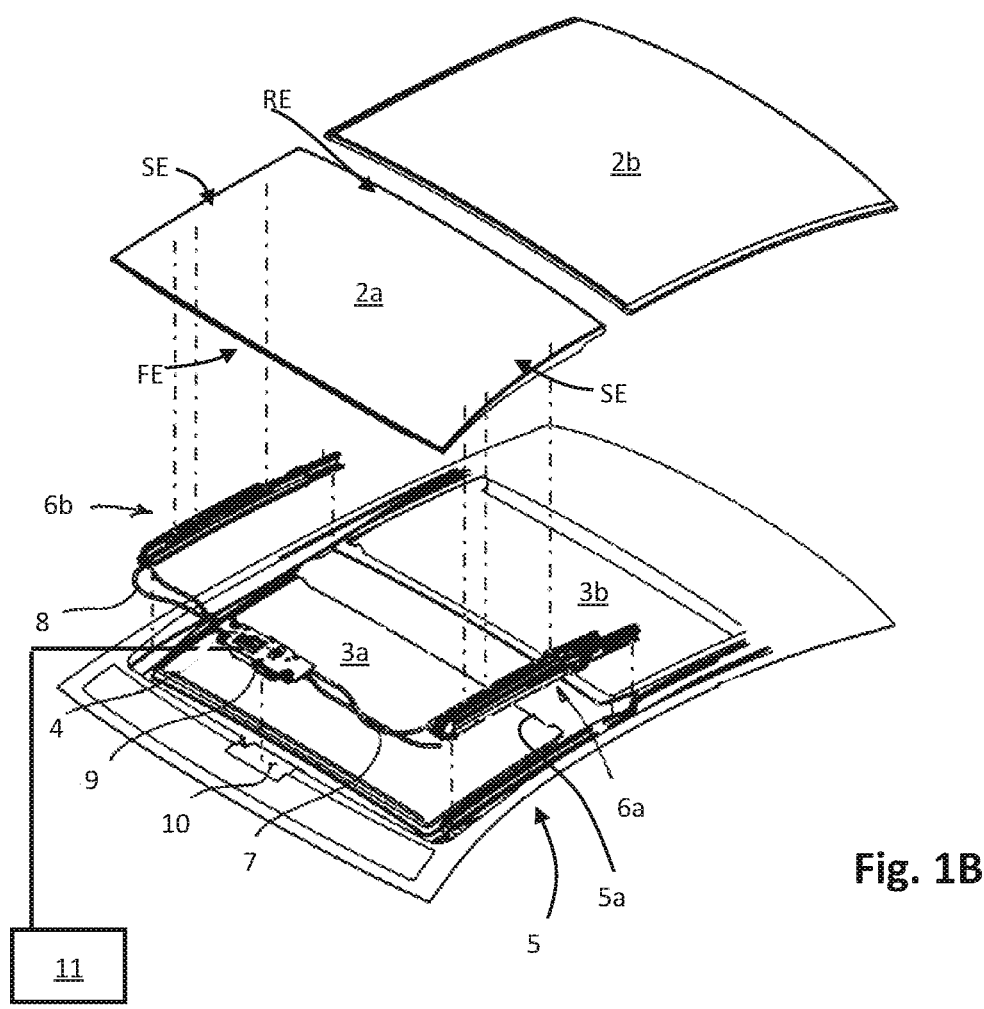
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end (FE) of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slidably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end (RE) of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end (RE), while an open position is reached by first lowering the rear end (RE) and then sliding the moveable panel 2a under the fixed panel 2b or any other structure or element provided behind the rear end (RE) of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end (FE) of the moveable panel 2a at a recess 10. In another embodiment, the electric motor 9 may be positioned at any other suitable position or location. For example, the electric motor 9 may be arranged near or below the rear end (RE) of the moveable panel 2a or below the fixed panel 2b.

A control unit 11 is schematically illustrated and is operatively coupled to the electric motor 9. The control unit 11 may be any kind of processing unit, either a software controlled processing unit or a dedicated processing unit, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the electric motor 9 and thus the moveable roof assembly.

Figure 2A:
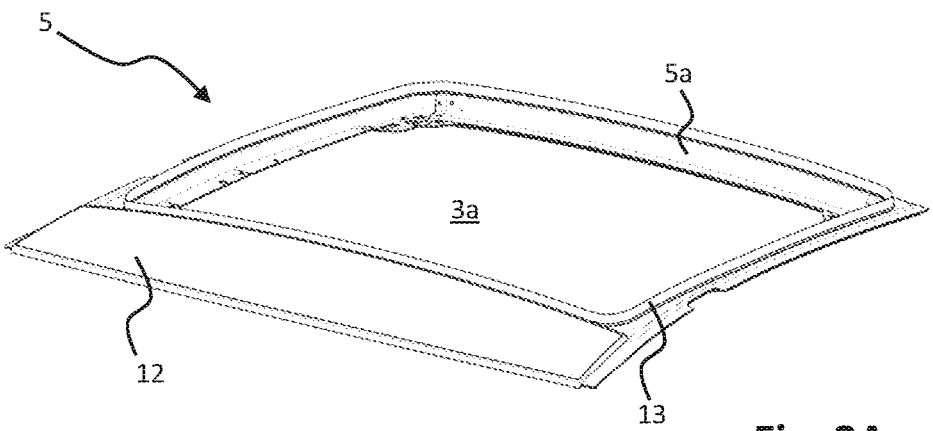
FIG. 2A shows a perspective view of a first embodiment of a frame assembly.

FIG. 2A shows a first embodiment of a frame assembly 5 for an open roof assembly. The frame assembly 5 defines the first roof opening 3a with the edge 5a of the frame assembly 5. A bulb seal 13 is provided around the edge 5a for sealing a moveable closure member in its closed state. A front cover panel 12 covers a front area of the frame assembly 5. When mounted on a vehicle body to form the roof, the front cover panel 12 is visible and provides an outer surface of the open roof assembly at the front of the open roof assembly.

Figure 2B:
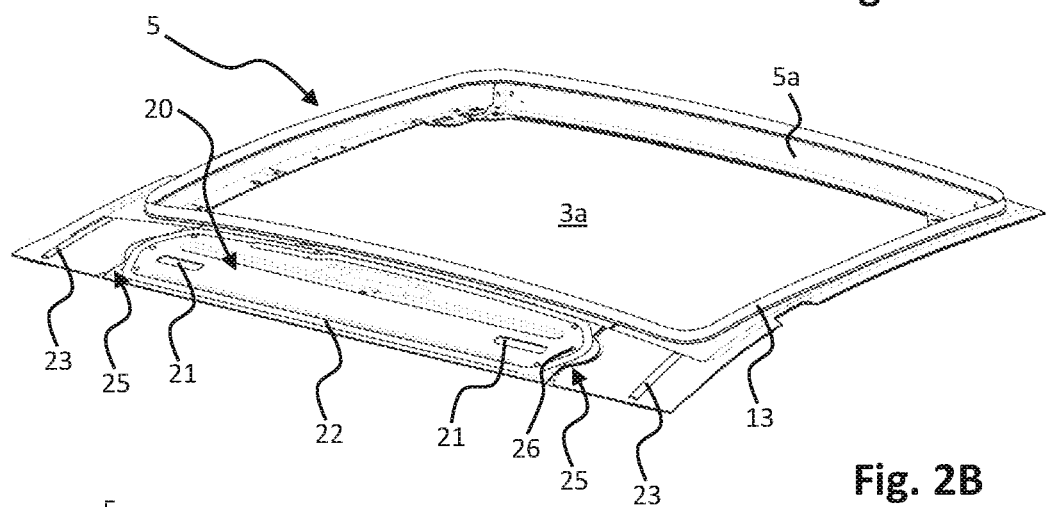
FIG. 2B shows a perspective view of a part of the first embodiment of FIG. 2A.

FIG. 2B shows the frame assembly 5 of FIG. 2A with the front cover panel removed. As shown, below the front cover panel, a dry area 20 is provided. In the dry area 20, two through-holes 21 are arranged. The dry area 20 is, inter alia, intended to prevent leakage of liquids like water to the interior of the vehicle through the through-holes 21. An adhesive bead 22 is provided at the circumference of the dry area 20. The adhesive bead 22 functions as a sealant for the dry area 20, preventing liquid ingress into the dry area 20, and functions as a support and holder for the front cover panel 12, holding the front cover panel 12 in place.

Two further supports 23—in this embodiment adhesive beads—are provided at side portions of the frame assembly 5 to support corresponding side ends of the front cover panel 12. It is noted that in prior art the adhesive bead 22 is commonly extended to the position of the further support 23. Two seams 25 are present at a position where separate parts of the frame assembly 5 are coupled. Adjacent to the seam 25, rivets 26 are provided for mechanical coupling of the front beam 51 and the left-side beam 52.

Figure 2C:
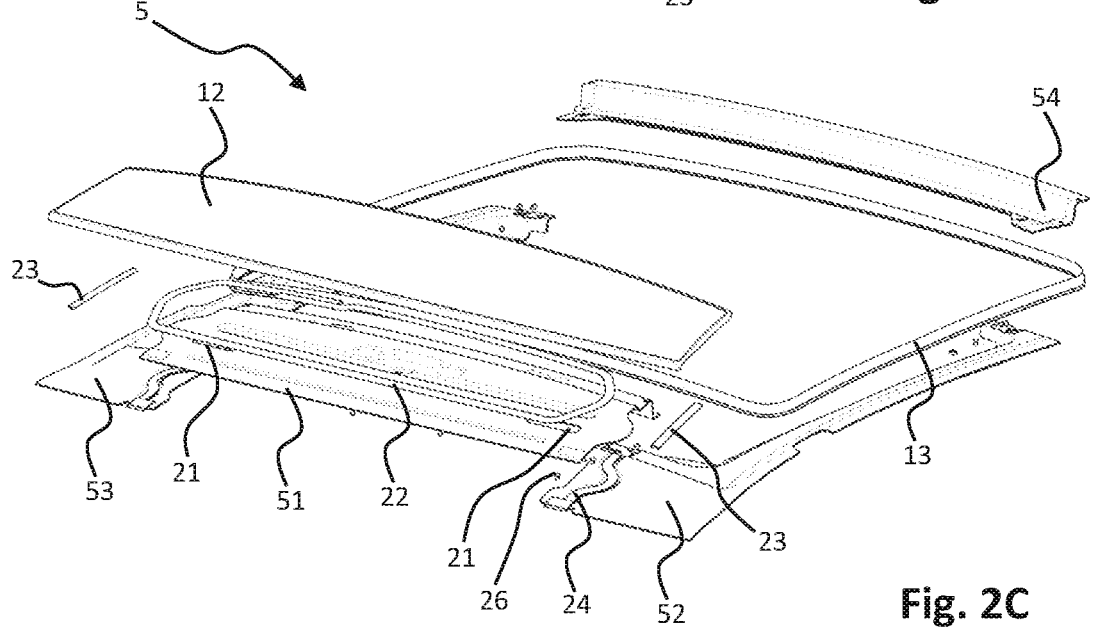
FIG. 2C shows an exploded perspective view of the first embodiment of FIG. 2A.

FIG. 2C shows the frame assembly 5 according to FIG. 2A in an exploded view. The frame assembly 5 comprises four beams: a front beam 51, a left-side beam 52, a right-side beam 53 and a rear beam 54. It is noted that the use of left-side and right-side are in no way intended to be limiting and are merely used to ease reference to either one of the two side beams 52 and 53.

In the exploded view of FIG. 2C, it is shown that adjacent the seam 25, the front beam 51 and the left-side beam 52 overlap and a sealant 24 is provided between the front beam 51 and the left-side beam 52. The sealant 24 ensures a liquid-tight coupling between the front beam 51 and the left-side beam 52. More details and elucidation is provided hereinbelow with reference to FIGS. 3A-3G, in which a method for providing the first embodiment of the frame assembly 5 according to FIGS. 2A—2C is described.

Figure 3A:
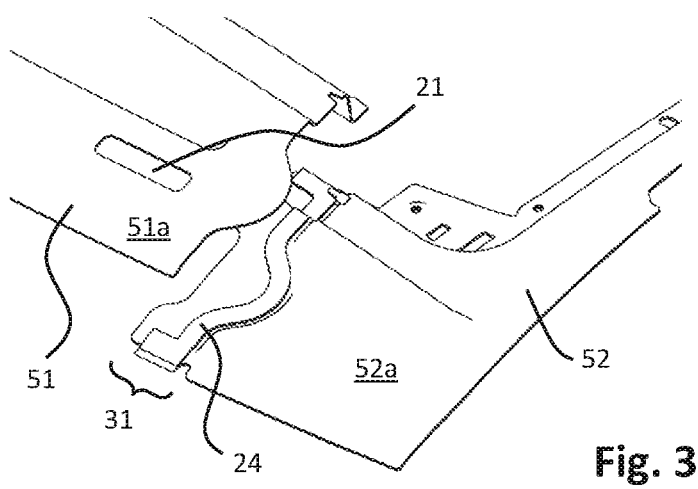
FIGS. 3A-3G illustrate an embodiment of the method.

FIG. 3A shows a first step of assembling the front beam 51 and the left-side beam 52 to form the frame assembly 5. The left-side beam 52 is provided with a recessed edge area 31. In the recessed edge area 31, the sealant 24 is provided. The front beam 51 is then arranged over the sealant 24. The front beam 51 is pushed to the extent that a top surface 51a is flush with a top surface 52a of the left-side beam 52, thereby the sealant 24 is pressed such that the sealant 24 is flattened between the front beam 51 and the left-side beam 52. Thus, the sealant 24 fills and closes a gap between the front beam 51 and the left-side beam 52, thereby providing the liquid-tight coupling.

Figure 3B:
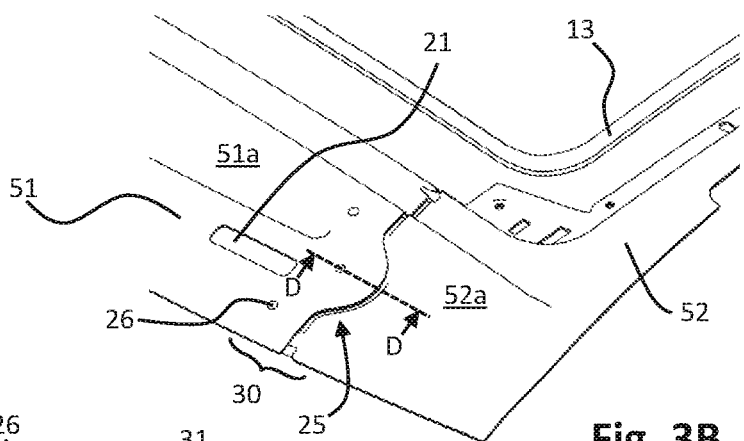

As shown in the top view of FIG. 3B, a next step of this embodiment comprises applying a mechanical attachment like a rivet 26, instantly fixating the front beam 51 and the left-side beam 52, even if the sealant 24 is not yet cured or dried. The instant fixation may be preferred to prevent waiting time during manufacturing. However, in an embodiment with a sealant with adhering properties, the mechanical attachment may be omitted. Further, in an embodiment, despite the use of mechanical attachment, the sealant 24 may still exhibit adhering properties, which may further strengthen the mechanical coupling when the sealant 24 has cured or dried.

Thus, a joint area 30 is formed. In the illustrated embodiment, the joint area 30 comprises the rivets 26, the recessed edge area 31, the sealant 24 and the seam 25. A cross-section of the joint area 30 along line D-D is illustrated in FIG. 3D, while FIG. 3C shows a bottom view of the joint area 30.

Figure 3C:
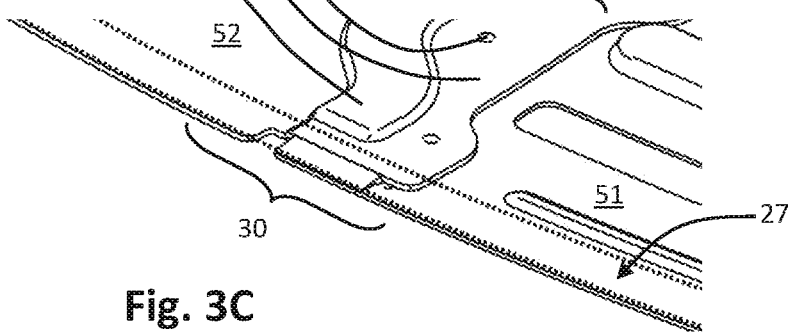

In FIG. 3C, the joint area 30 is shown to comprise the recessed edge area 31 of the left-side beam 52. The rivet 26 is arranged in a mechanical coupling area 32, which is a part of the recessed edge area 31. Further, the sealant 24 (not visible in the view of FIG. 3C) is provided in a sealing area 33, which is a part of the recessed edge area 31 as well. A mounting adhesive location 27 is indicated by dotted lines. When mounting the frame assembly on a vehicle body, a bead of suitable adhesive is applied to the mounting adhesive location 27 and is then adhered to the vehicle body. At the joint area 30, the bead of adhesive in the mounting adhesive location 27 fills any variations in height level, ensuring liquid tightness.

Figure 3D:
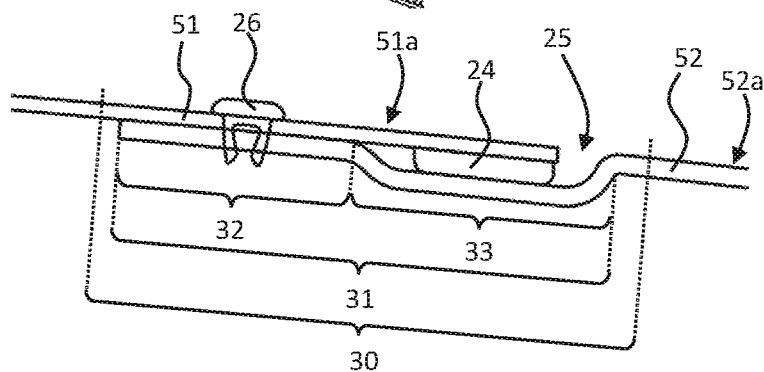

FIG. 3D illustrates the joint area 30 in more detail. The recessed edge area 31 of the left-side beam 52 is mechanically coupled to the front beam 51 at the mechanical coupling area 32 with a mechanical attachment like a rivet 26, although any other mechanical attachment like a screw, a clip or a weld, for example, may be suitably used as well. A person skilled in the art readily understands which mechanical attachment may be suitable and is enabled to adapt the design of the joint area 30 to such mechanical attachment, if needed. Further, the sealant 24 is arranged between the front beam 51 and the sealing area 33 of the left-side beam 52. The sealing area 33 is recessed relative to the mechanical coupling area 32 for providing a spacing between the front beam 51 and the left-side beam 52, which spacing is filled by the sealant 24. The spacing provides the possibility to accurately control the sealant 24 during manufacturing, e.g. to prevent sealant 24 to bulge out of the seam 25. Thus, a flush surface of the top surface 51a and the top surface 52a, albeit with the recessed seam 25 in between, is provided.

Figure 3E:
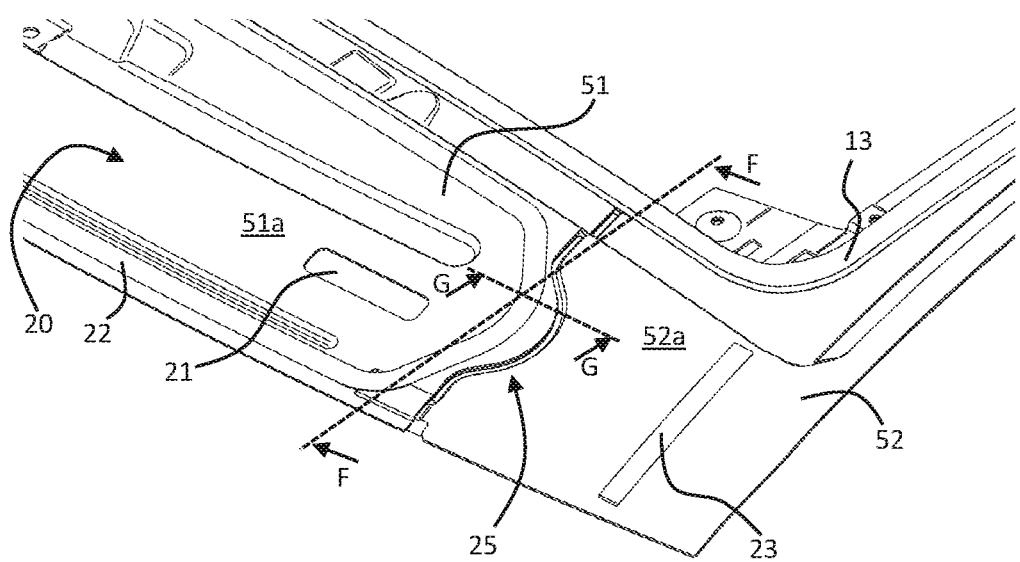

Having coupled and sealed the front beam 51 and the left-side beam 52, FIG. 3E illustrates a next step. The bead of adhesive 22 is provided in a closed ring shape for forming the sealed dry area 20. Further, the further support 23 like a further adhesive bead is provided on the left-side beam 52.

The bead of adhesive 22 is provided solely on the front beam 51 without crossing the seam 25. Since height variations at the seam 25 reduce the reliability of the sealing of the adhesive bead 22 at such position, the dry area 20 is positioned on the front beam 51 only, alleviating the requirements on the adhesive bead 22. Moreover, due to the reduced reliability, a liquid-tightness test would be required if the adhesive bead 22 would cross the seam 25. By omitting such crossing, the liquid-tightness test is not needed.

Figure 3F:
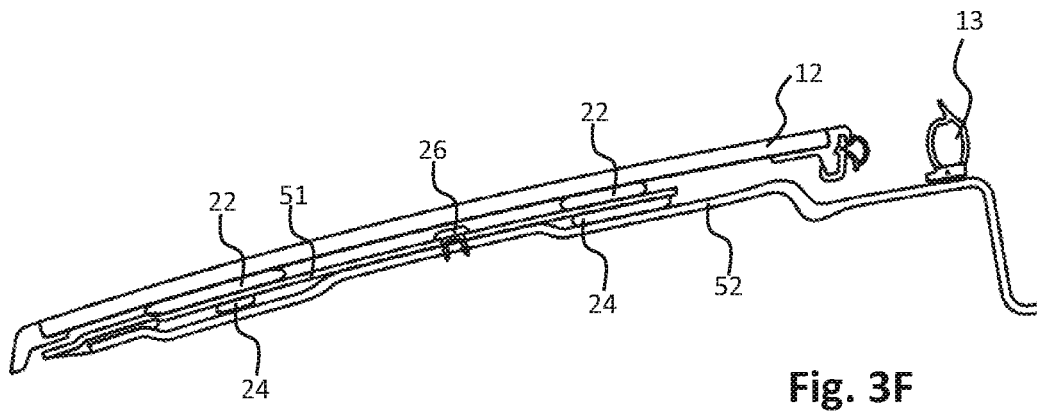
Figure 3G:
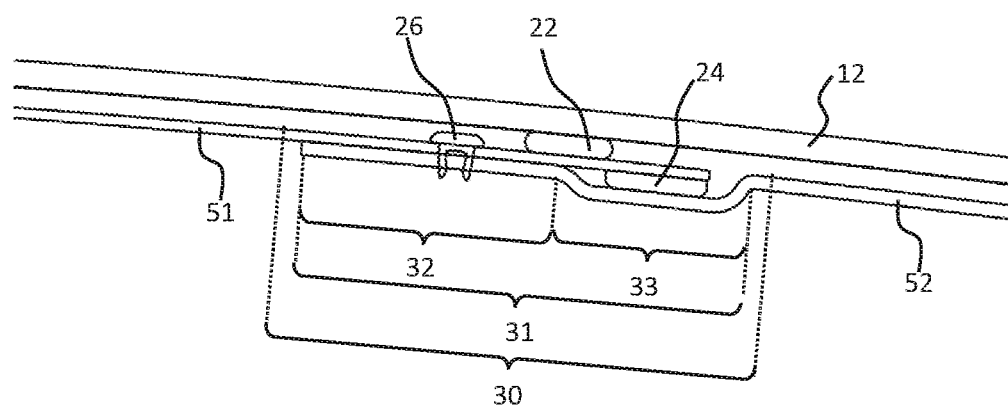

Cross-sections along lines F-F and G-G, respectively, as shown in FIG. 3E are shown in FIGS. 3F and 3G with the front cover panel 12 mounted on the adhesive bead 22.

Figure 4:
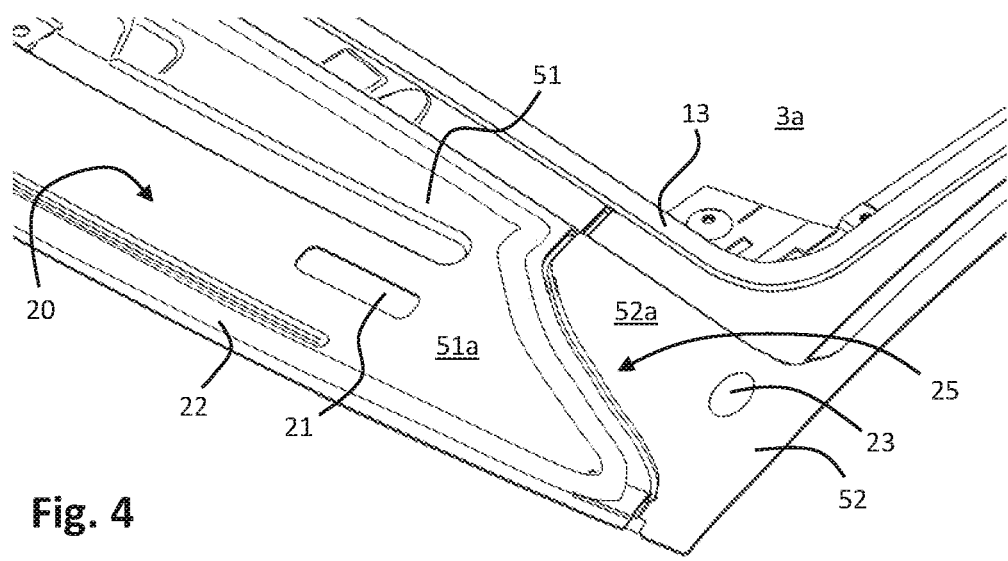
FIG. 4 shows a perspective view of a second embodiment of a frame assembly.

FIG. 4 illustrates a second embodiment, wherein the shape and position of the joint area 30 is shaped such that the adhesive bead 22 may be extended further towards a side of the frame assembly. As a consequence, the further support 23 may be reduced in size or may even be omitted at all. Further, in view of air flows and noise generation by such air flows, it may be preferred to have a sealed front line (i.e. a line close to a front edge of the frame assembly, which is the edge of the front beam 51 farthest away from the opening 3a, for example) between the front cover panel 12 on the one hand and the front beam 51 and the left-side beam 52 on the other hand. The second embodiment as illustrated provides an extended length of such front line of the adhesive bead 22.

Figure 5:
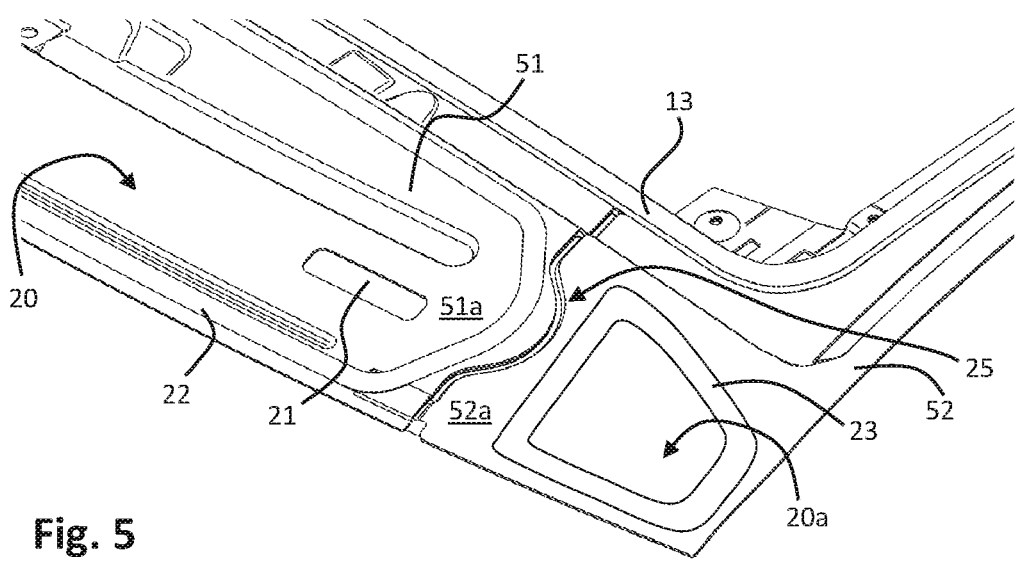
FIG. 5 shows a perspective view of a third embodiment of a frame assembly.

FIG. 5 illustrates a third embodiment, wherein a second dry area 20a is provided by forming a closed-ring shaped further support 23 by use of a bead of adhesive, for example. To prevent liquid leakage at the seam 25, neither of the adhesive beads 22, 23 cross the seam 25.

Figure 6A:
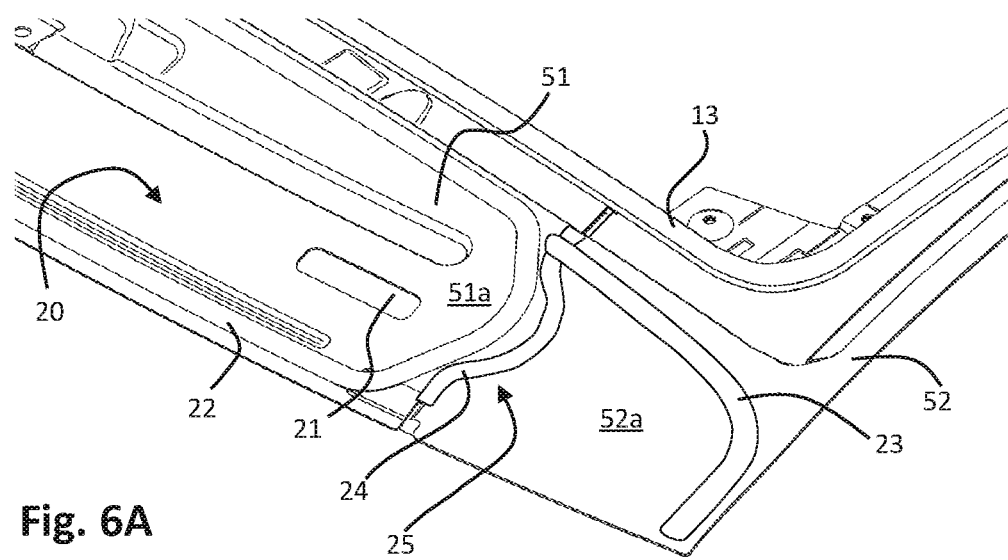
FIG. 6A shows a perspective view of a fourth embodiment of a frame assembly.
Figure 6B:
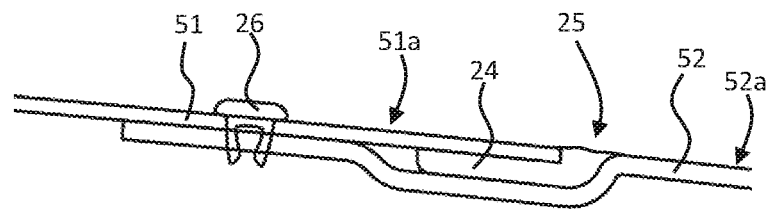
FIG. 6B shows a cross-sectional view of the fourth embodiment of FIG. 6A.

FIGS. 6A and 6B illustrate a fourth embodiment, wherein the sealant 24 is provided in an excessive amount such that during mounting of the front beam 51 and the left-side beam 52 the sealant 24 bulges from the seam 25. Then, the excess amount of sealant 24 may be wiped or scraped flush with the top surface 51a and the top surface 52a. With such a flush seam 25, an adhesive bead forming the support 23 may be arranged over the seam 25. While the possibility of liquid leakage is reduced, the leakage may still occur. Still, the dry area 20 is still sealed by the adhesive bead 20 and leakage between the seam 25 and the further support 23 may be accepted as a possibility. Still, the further support 23 support the front cover panel 12 over a longer length and closes any air flow opening for preventing air flow noise.

Figure 7A:
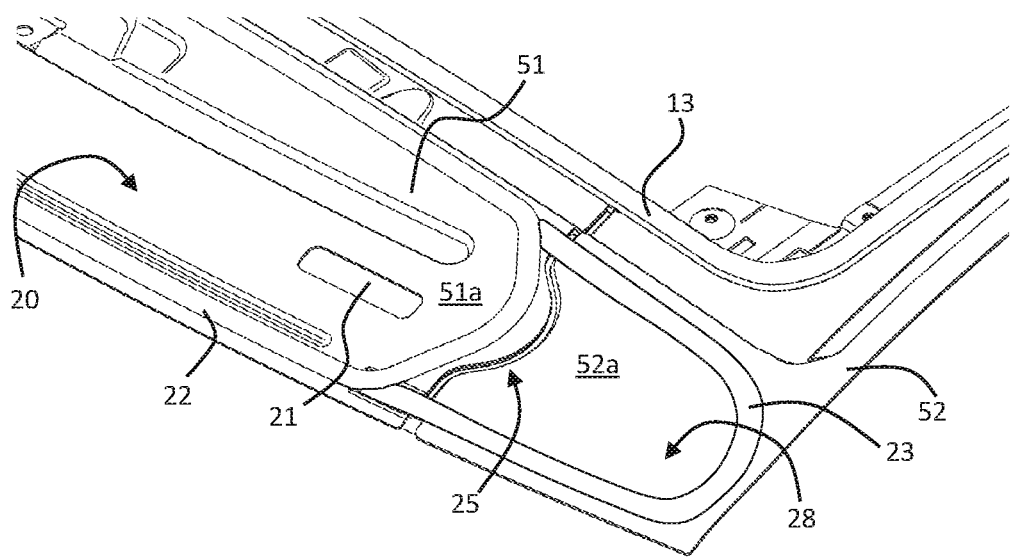
FIG. 7A shows a perspective view of a fifth embodiment of a frame assembly.
Figure 7B:
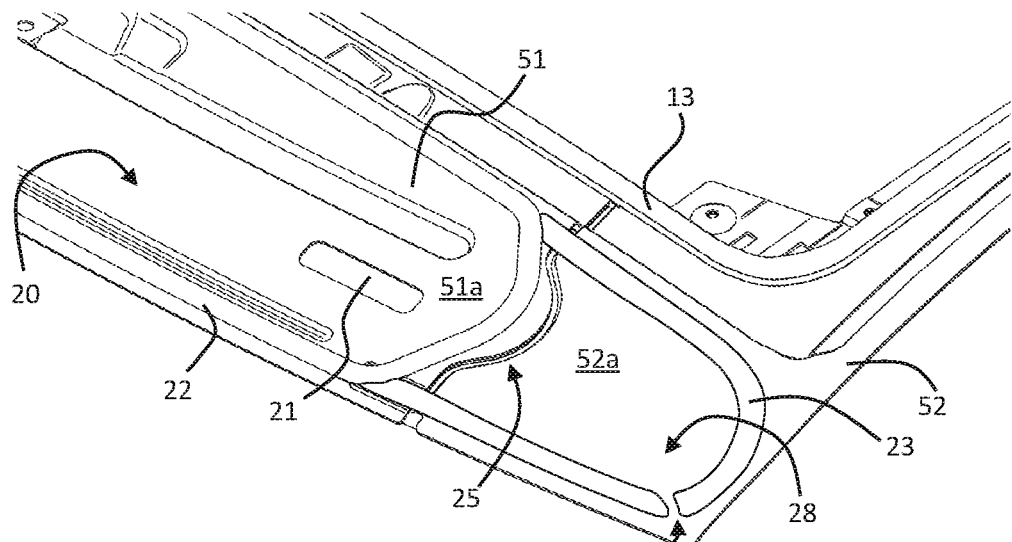
FIG. 7B shows a perspective view of a sixth embodiment of a frame assembly.

Leakage at a crossing of the seam 25 and the further support 23 is also accepted in the fifth and sixth embodiments as illustrated in FIGS. 7A and 7B, respectively. The fifth embodiment of FIG. 7A provides an adhesive bead as the further supports 23, wherein the adhesive bead extends as a semi-circle from the adhesive bead 22 and back to the adhesive bead 22, thereby crossing the seam 25 twice. Liquid may be leaking through one or both the crossings. In particular, with sufficient control of the amount of adhesive of the further support 23, it may be presumed that the crossings will not be liquid-tight. Thus, air flow and related noises may be prevented, while water management is not affected. Liquid may enter at a higher position and may flow out at a lower position.

If such liquid flow cannot be guaranteed at the crossings, in order to prevent a build-up of collected water in an enclosed space 28, a dedicated liquid-flow channel 29 may be provided at a lowest position of the enclosed space 28, as illustrated in FIG. 7B.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

Aspects of the invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A frame assembly for an open roof assembly, the frame assembly comprising a first beam, a second beam and a panel,
wherein
the first beam and the second beam are mechanically coupled in a joint area, thereby forming a seam;
a sealant is provided in the joint area for providing a liquid-tight joint;
the panel is at least partly arranged over the first beam and the second beam such that the joint area is at least partly overlapped by the panel; and
an adhesive bead is solely provided on the first beam for supporting the panel on the first beam, the adhesive bead sealing a dry area between the first beam and the panel.

2. The frame assembly according to claim 1, wherein the adhesive bead forms a ring, the ring of adhesive forming and enclosing the dry area.

3. The frame assembly according to claim 1, wherein the panel is supported on the second beam by a further support.

4. The frame assembly according to claim 3, wherein the adhesive bead is a first adhesive bead and wherein the panel is supported on the second beam by a second adhesive bead.

5. The frame assembly according to claim 1, wherein the sealant is an adhesive sealant and wherein the first beam and the second beam are mechanically coupled by the adhesive sealant.

6. The frame assembly according to claim 1, wherein the first beam and the second beam are mechanically coupled by a mechanical attachment.

7. The frame assembly according to claim 1, wherein the mechanical attachment comprises an adhesive, a screw, a rivet, a clip, a weld and/or a spot-weld.

8. The frame assembly according to claim 1, wherein a through-hole is formed in the first beam and wherein the dry area is arranged over the through-hole.

9. The frame assembly according to claim 1, wherein the first beam and the second beam at least partly overlap in the joint area and wherein the sealant is arranged between the first beam and the second beam where the first beam and the second beam overlap.

10. The frame assembly according to claim 9, wherein one of the first beam and the second beam comprises a recessed edge area and wherein the other one of the first beam and the second beam is arranged overlapping the recessed edge area.

11. The frame assembly according to claim 9, wherein one of the first beam and the second beam comprises a mechanical coupling area and a sealing area, the sealing area being recessed relative to the mechanical coupling area, and wherein
the first beam and the second beam are mechanically coupled in the mechanical coupling area; and
the sealant is arranged between the first beam and the second beam in the sealing area.

12. The frame assembly according to claim 1, wherein the first beam is a front beam, the second beam is a side beam and the panel is a front cover panel.

13. A method of providing a frame assembly comprising a first beam, a second beam and a panel, wherein the method comprises
providing a sealant on a surface of one of the first beam and the second beam;
mechanically coupling the first beam and the second beam in a joint area, thereby forming a seam, wherein the sealant is arranged in the joint area for providing a liquid-tight joint;
providing an adhesive bead solely on the first beam for supporting the panel on the first beam and sealing a dry area between the first beam and the panel; and
arranging the panel on the adhesive bead and at least partly over the first beam and the second beam such that the joint area is at least partly overlapped by the panel.

* * * * *